US006879242B1

(12) United States Patent
Alon

(10) Patent No.: US 6,879,242 B1
(45) Date of Patent: Apr. 12, 2005

(54) COLOR BASED LOCK AND KEY

(76) Inventor: Israel Alon, House #66, Kfar Yehoshua (IL), 30063

(*) Notice: Subject to any disclaimer, the term of this patent is extended or adjusted under 35 U.S.C. 154(b) by 236 days.

(21) Appl. No.: 10/088,316

(22) PCT Filed: Sep. 11, 2000

(86) PCT No.: PCT/IL00/00556

§ 371 (c)(1),
(2), (4) Date: Mar. 15, 2002

(87) PCT Pub. No.: WO01/20923

PCT Pub. Date: Mar. 22, 2001

(30) Foreign Application Priority Data

Sep. 16, 1999 (IL) ............................................... 131928

(51) Int. Cl.[7] ............................................... G05B 19/00

(52) U.S. Cl. .......................... 340/5.6; 340/5.2; 340/5.8; 340/5.66; 340/5.23; 340/5.27; 70/277; 70/278.2; 70/393; 70/395; 40/330; 40/634; 382/182

(58) Field of Search .......................... 340/5.6, 5.2, 5.8, 340/5.66, 5.23, 5.27; 70/277, 278.2, 393, 395; 40/330, 634; 382/182

(56) References Cited

U.S. PATENT DOCUMENTS 1,816,642 A * 7/1931 Fetter .......................... 40/330
3,639,906 A * 2/1972 Tritsch ...................... 340/5.66
3,733,862 A * 5/1973 Killmeyer .................... 70/277
4,274,080 A * 6/1981 Brunken .................... 340/5.23
4,288,780 A * 9/1981 Theodoru et al. ........... 382/182
4,336,701 A * 6/1982 Raymond .................... 70/395
5,465,084 A * 11/1995 Cottrell ..................... 340/5.27

* cited by examiner

*Primary Examiner*—Ario Eitenne
*Assistant Examiner*—Yves Dalencourt
(74) *Attorney, Agent, or Firm*—Darby & Darby

(57) ABSTRACT

A colored based lock and key, wherein the key includes a color indication incorporated thereon, and the lock includes a color sensor for identifying the color indication, so as to open the lock. According to a preferred embodiment of the invention, the key includes a blank or blanks on which at least one, and preferably a plurality of colors are incorporated. The blank or blanks can be formed of metal, plastic, or any other material on which colors or color emitting or color reflecting materials can be incorporated by various methods. According to other preferred embodiments of the present invention, the lock includes at least one color sensor arranged to sense the color incorporated on the key or on a predefined sequence of keys, when the key or keys are inserted in the lock, or put across the lock or rotated in the lock, and further includes a decision mechanism activated by an electric signal generated upon identification of the color incorporated on the key, to permit opening of the lock. According to another embodiment of the invention, the color sensor includes a light source for directing light at the color incorporated on the key, a reflected light detector, an evaluation unit for determining frequency, and perhaps intensity, of the reflected light.

22 Claims, 2 Drawing Sheets

COLOR BASED LOCK AND KEY

CROSS-REFERENCE TO RELATED APPLICATIONS

This application is a U.S. national phase application under 35 U.S.C. §371 based upon co-pending International Application No. PCT/IL00/00556 filed Sep. 11, 2000, the entire disclosure of which is incorporated herein by reference. The international application was published in the English language on Mar. 22, 2001 under Publication No. WO 01/20923.

FIELD OF THE INVENTION

The present invention relates to locks and keys in general and, in particular, to a color based lock and key.

BACKGROUND OF THE INVENTION

Locks and keys of many shapes and kinds have long been known in the art. Traditionally, keys consist of metal blanks in which holes or depressions are formed which correspond to pins or tumblers in the lock. Recently, electronic locks and keys have been designed, which include a variety of electronic codes transmitted between the lock and the key, wherein the lock electronically opens when the codes are properly identified, and plastic keys with a magnetic strip which is read by a reader in the lock.

Traditional locks and keys suffer from the disadvantage that they can easily be copied for improper use. In addition, other mechanical means, such as bent strips of metal or other more specialized tools, can often open the mechanical locks, in addition to the correct key. Advanced mechanical locks, Electronic and magnetic locks and keys are complicated and costly to manufacture. Accordingly, there is a long felt need for and it would be very desirable to have a traditional-looking key which is easy to use, which is harder to copy, and which corresponds to a lock which cannot be opened except with the proper key.

SUMMARY OF THE INVENTION

According to the present invention, there is provided a lock and key, wherein the key includes a color indication incorporated thereon, and the lock includes a color sensor for identifying the color indication, so as to open the lock.

According to one embodiment of the invention, the key includes a blank or blanks on which at least one, and preferably a plurality of colors are incorporated. The blank or blanks can be formed of metal, plastic, or any other material on which colors or color emitting or color reflecting materials can be incorporated by various methods.

Further according to one embodiment of the present invention, the lock includes at least one color sensor arranged to sense the color incorporated on the key or on a predefined sequence of keys, when the key or keys are inserted in the lock, or put across the lock or rotated in the lock, and further includes a decision mechanism activated by an electric signal generated upon identification of the color incorporated on the key, to permit opening of the lock.

According to one embodiment of the present invention, a plurality of said keys is inserted in the lock and identified by said decision mechanism to permit opening of the lock.

According to a preferred embodiment of the present invention, the lock includes a plurality of color sensors arranged to sense a plurality of colors incorporated on the key when the key is inserted in the lock, and further includes a decision mechanism activated by an electric signal generated upon identification of all the colors to permit opening of the lock.

According to one embodiment of the invention, the color sensor includes means to actually measure a color based on a pre-selected color model.

According to another embodiment of the invention, the color sensor includes a light source for directing light at the color incorporated on the key, a reflected light detector, an evaluation unit for determining frequency, and perhaps intensity, of the reflected light.

According to yet another embodiment of the invention, the key includes a light source for directing light at the color incorporated on the key.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a color based lock and key system wherein the key includes at least one, and preferably a plurality of colors incorporated thereon, and the lock includes at least one, and preferably a plurality of color sensors arranged to sense and identify the color or colors on the key. In accordance with the identification of the colors incorporated on the key, the lock provides a decision as to whether the colors identified are appropriate to open the lock.

Figure 1:
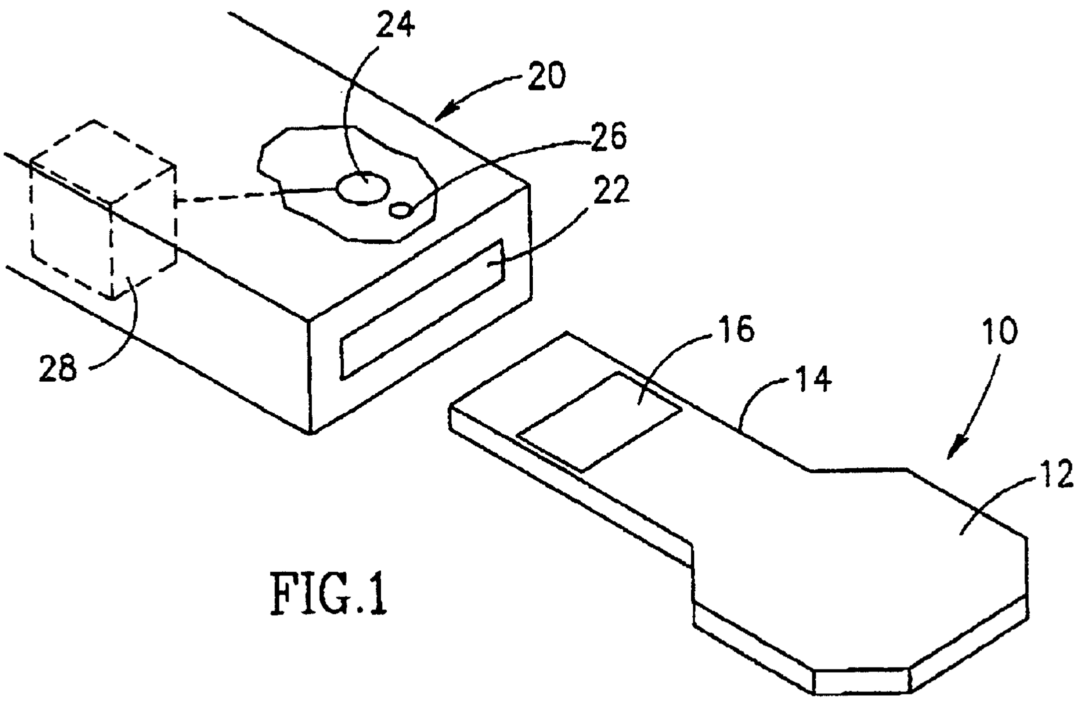
FIG. 1 is a schematic illustration of a lock and key constructed and operative in accordance with one embodiment of the present invention.

Referring now to FIG. 1, there is shown a schematic illustration of a key 10 and lock 20 constructed and operative in accordance with one embodiment of the present invention. Key 10 includes a handle or head 12, a key body 14, and at least one color 16 incorporated on the key. According to a preferred embodiment of the invention, the key includes a plurality of colors 16. It will be appreciated that the greater the number of colors to be identified on the key, and the larger the number of possible combinations of those colors, the more difficult it will be to overcome the lock mechanism and open the lock with an incorrect or unauthorized copied key. It will be further appreciated that color or a plurality of colors 16 may be incorporated on one or on a plurality of sides of key body 14 (not shown).

Lock 20 includes a key-receiving recess 22 in which are mounted at least one, and preferably a plurality of color sensors 24, one color sensor corresponding to each color on the complementary key. Generally, a light source 26 is also provided to illuminate the colors on the key for sensing by color sensors 24. It will be appreciated that key 10 may include a light source to illuminate the colors incorporated on the key. Lock 20 also includes a decision making unit which serves to receive the sensed color from the color sensor, compare the sensed color with the expected color on the appropriate key, and provide a decision signal to open or not open the lock, based on whether the sensed color is substantially identical to the expected color.

Figure 2:
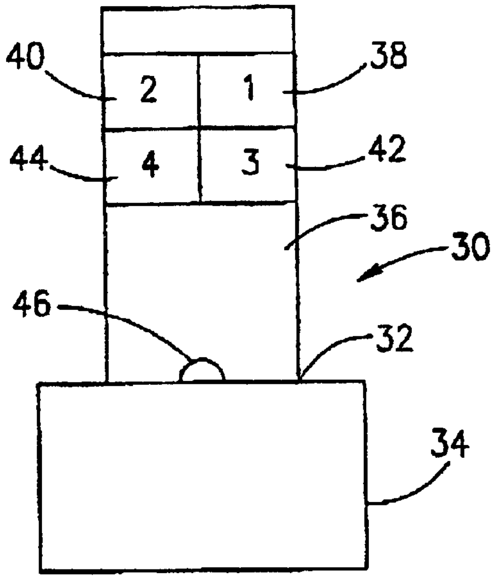
FIG. 2 is a schematic plan view of a key constructed and operative in accordance with one embodiment of the present invention.

Referring now to FIG. 2, there is shown a schematic illustration of a key 30 constructed and operative in accordance with one embodiment of the present invention, by way of example only. Key 30 includes a blank 32, which includes a head 34, for holding the key, and a key body 36, as known. Key 30 may also include a light source 46 to illuminate the colors incorporated on the key. In the illustrated embodiment, four colors 38, 40, 42, and 44 are incorporated on the key. The blank can be formed of metal, plastic, or any other material on which colors can be incorporated and on which they will endure over time. For example, the colors can be painted on key 30 in any known fashion which provides a uniform, controlled, unique color over the entire surface area painted with that color or the key can be transparent and include cells filled with colored substances or gas. Alternatively, any other method of incorporating a substantially uniform color can be utilized.

Figure 3:
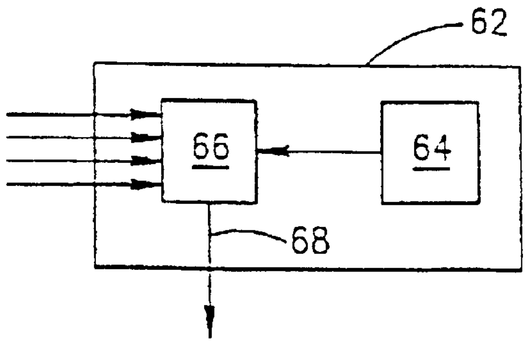
FIG. 3 is a schematic illustration of the color scanning and identification unit in a lock according to one embodiment of the present invention.

In FIG. 3, there is shown a schematic illustration of a lock 50 constructed and operative in accordance with one embodiment of the present invention, by way of example only, for use with the key of FIG. 2. Lock 50 includes four color sensors 52, 54, 56, and 58, each corresponding to one of colors 38, 40, 42, and 44 incorporated on key 30. Color sensors 52, 54, 56, and 58 may be any color sensor capable of identifying a color incorporated on the key when inserted into the key-receiving recess and of providing an output signal indicating a pre-determined value of the degree of identification of the sensed color. These color sensors generally include means to actually measure a color based on a pre-selected color model. One group of sensors includes a light source 60 for directing light at the color incorporated on the key, a reflected light detector, an evaluation unit for determining frequency, and perhaps intensity, of the reflected light and provide an electric signal indicating the value of the degree of identification of the sensed color. Examples of color sensors, to show the possible nature of a suitable color sensor, among many on the market, include the Rechner Colour Analysis System, manufactured and marketed by Rechner Electronics Industries Inc., New York, USA, wherein the object is subjected to a high-intensity light, and the remitted white light is transferred to the color sensor which evaluates the red-green-blue particles, which are given an analog value and sent to an evaluation amplifier to identify the color, and Omron E3MC RGB color sensor, or Integrated Control Solutions Inc., Massachusetts, USA, yet another suitable color sensor is a single color spectrophotometer. Lock 50 also includes a source 60 of light for illuminating the key when it is inserted in the key-receiving recess of the lock, if required by the particular color sensor. According to one embodiment of the invention, insertion of key 30 serves to mechanically activate a switch (not shown) which turns on source 60 of light.

Figure 4:
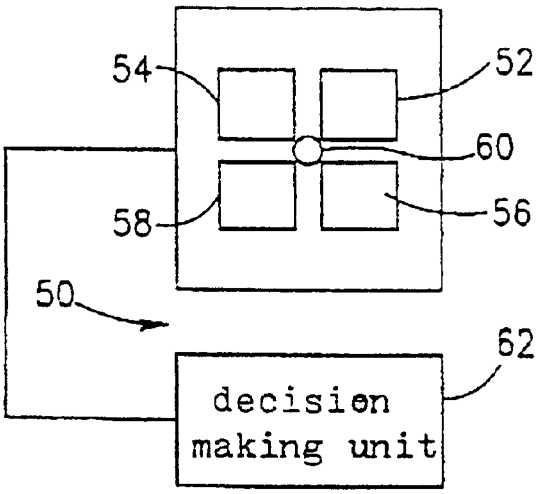
FIG. 4 is a block diagram illustration of a decision making unit in a lock according to one embodiment of the present invention.

Lock 50 also includes a decision making unit 62, one embodiment of which is illustrated schematically in FIG. 4. Decision making unit 62 is coupled to each of color sensors 52, 54, 56, and 58. Decision making unit 62 includes a memory unit 64 in which the expected color, i.e., the color painted on the complementary key, is stored. Where there are a number of colors on the key, memory unit 64 stores the identification of each of the expected colors, as well as their expected relative location on the key.

Decision making unit 62 also includes a comparator 66 coupled to memory unit 64 and coupled to each of color sensors 52, 54, 56, and 58 and arranged to receive therefrom a signal indicating the color sensed by each color sensor. Comparator 66 compares the values of the degree of identification of the sensed color or colors arrangement received from the color sensors with the pre-determined values of the degree of identification of colors and color arrangement stored in memory unit 64 and provides an output signal 68 indicating that the required degree of identification has been reached, or that it has not been reached. The output signal is sent to a lock opening mechanism (not shown) which either opens, or does not open, the lock, depending upon the signal received. The lock opening mechanism can be manually activated (after the decision making unit permits opening), electrically or electronically operated, or operated in any other manner which can be activated by the decision making unit.

Figure 5:
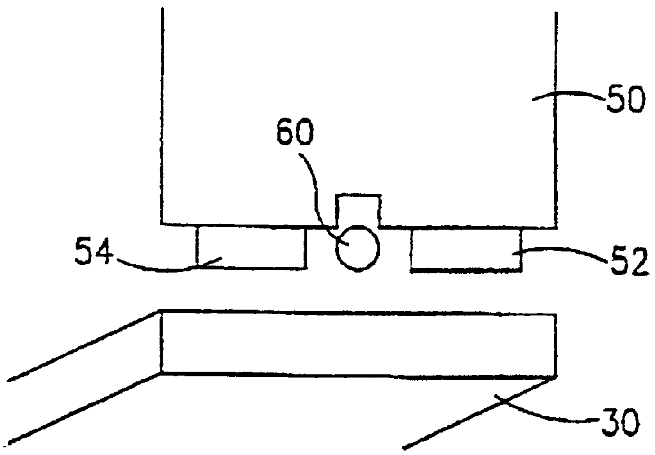
FIG. 5 is a schematic sectional view of the operation of a lock and key according to one embodiment of the invention.

Operation of the lock and key system according to one embodiment of the present invention is as illustrated schematically in FIG. 5. The key 30 has the desired colors incorporated thereon. The key is inserted into the key-receiving recess of the complementary lock 50, and each of the color sensors in the lock senses the color in registration therewith on the key. It will be appreciated that key 30 may be rotated and the color sensors in the lock senses the color or colors incorporated on a plurality of sides of key 30. Further, the color sensors in the lock can be arranged to sense a predefined sequence of keys inserted in the lock 50. The value of the degree of identification of the sensed color is stored in the memory unit of the lock. The lock is now mounted in place and coupled to a lock opening mechanism, as known.

When it is desired to open the lock, the key 30 is inserted into the key-receiving recess. Insertion of the key activates a switch and activates light source 60 (or other color sensing means). The color sensors 52 and 54 now identify the color on the key in registration with each color sensor, and send an indication signal of the value of the degree of identification of the sensed color to the decision making unit. The decision making unit compares the values of the indication signals of the sensed colors with the pre-determined stored values and gives an open or not open signal to the lock actuating mechanism.

It is a particular feature of the present invention that the lock and key cannot be copied, due to the difficulty of exactly copying one or more colors. In addition, they provide ultimate security, since the lock cannot be by-passed, but only the correct color or combination of colors will permit the decision mechanism to signal that the lock can be opened.

It will be appreciated that the invention is not limited to what has been described hereinabove merely by way of example. Rather, the invention is limited solely by the claims which follow.

What is claimed is:

1. A lock and key, characterized in that the key includes a pre-selected color indication incorporated thereon, and the lock includes a color sensor for identifying said color indication, so as to identify said key and open the lock.

2. The lock and key according to claim 1, wherein the key includes a blank on which at least one pre-selected color is incorporated.

3. The lock and key according to claim 1, wherein the key includes a blank on which a plurality of pre-selected colors are incorporated.

4. The lock and key according to claim 1, wherein the key includes at least one blank on which at least one pre-selected colors are incorporated.

5. The lock and key according to claim 1, wherein the key includes a plurality of blanks on which a plurality of pre-selected colors are incorporated.

6. The lock and key according to claim 1, wherein said pre-selected color is painted on the key.

7. The lock and key according to claim 1, wherein the key is transparent, and said pre-selected color is provided by a substance in a cell in the key.

8. The lock and key according to claim 1, wherein the lock includes a plurality of color sensors.

9. A lock and key characterized in that:

the key includes a pre-selected color indication incorporated thereon; the lock includes at least one color sensor arranged to sense said color indication when the key is inserted in the lock;

a decision mechanism activated upon identification of said color to permit opening of the lock.

10. The lock and key according to claim 9, wherein said decision mechanism includes:

a memory unit for storing a pre-determined value of the degree of identification of the sensed said pre-selected color;

means to provide an output signal indicating whether or not said pre-selected color is substantially identical to said sensed color.

11. The lock and key according to claim 9, wherein the lock includes a plurality of color sensors.

12. The lock and key according to claim 9, wherein said color sensor includes means to measure a color incorporated on the key based on a pre-selected color model.

13. The lock and key according to claim 9, wherein said color sensor includes a light source for directing light at said color incorporated on the key, a reflected light detector, and an evaluation unit for determining frequency of said reflected light.

14. The lock and key according to claim 9, wherein said key includes a light source for directing light at said color incorporated on the key.

15. A lock and key, characterized in that the key includes a pre-selected color indication incorporated thereon, and the lock includes a color sensor for identifying said color indication, so as to identify said key and open the lock, wherein the lock includes at least one color sensor arranged to sense said color incorporated on the key, when a plurality of keys are inserted in the lock in a predefined sequence, and further includes a decision mechanism activated upon identification of said color to permit opening of the lock.

16. A lock and key, characterized in that the key includes a pre-selected color indication incorporated thereon and the lock includes a color sensor for identifying said color indication, so as to identify said key and open the lock, wherein the lock includes at least one color sensor arranged to sense said color incorporated on the key, when a plurality of keys are in the lock, and further includes a decision mechanism activated upon identification of said color to permit opening of the lock.

17. A lock and key, characterized in that the key includes a pre-selected color indication incorporated thereon, and the lock includes a color sensor for identifying said color indication, so as to identify said key and open the lock, wherein said color sensor includes means to measure a color incorporated on the key based on a pre-selected color model.

18. A lock and key, characterized in that the key includes a pre-selected color indication incorporated thereon, and the lock includes a color sensor for identifying said color indication, so as to identify said key and open the lock, wherein said color sensor includes a light source for directing light at said color incorporated on the key, a reflected light detector, and an evaluation unit for determining frequency of said reflected light.

19. The lock and key according to claim 18, wherein said key includes a light source for directing light at said color incorporated on the key.

20. A method of opening a lock comprising the steps of:

providing at least on key having at least one pre-selected color incorporated thereon;

providing a complementary lock having at least one color sensor therein;

sensing the color on the key inserted into said lock;

comparing the value of the degree of identification of said sensed color with the stored pre-determined value of identification of said pre-selected color; and providing a lock opening signal when said pre-selected color is substantially identical to said sensed color.

21. A method of opening a lock according to claim 20, wherein a plurality of said keys is inserted into said lock in a predefined sequence.

22. A method of opening a lock comprising the steps of:

providing at least one key having at least one pre-selected color incorporated thereon;

providing a complementary lock having at least one color sensor therein;

sensing the color on said key inserted into said lock and rotated therein;

comparing the value of the degree of identification of said sensed color with the stored pre-determined value of identification of said pre-selected color; and providing a lock opening signal when said pre-selected color is substantially identical to said sensed color.

* * * * *